US008488018B2

(12) United States Patent
Maeda et al.

(10) Patent No.: US 8,488,018 B2
(45) Date of Patent: Jul. 16, 2013

(54) IMAGE BLUR CORRECTION UNIT, LENS BARREL DEVICE, AND CAMERA APPARATUS

(75) Inventors: Ippei Maeda, Saitama (JP); Tatsuyuki Nakayama, Kanagawa (JP); Hiroto Ogiyama, Kanagawa (JP); Yoshinori Mutoh, Tokyo (JP); Yasuto Matsubara, Gifu (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/531,155

(22) Filed: Jun. 22, 2012

(65) Prior Publication Data

US 2012/0262588 A1 Oct. 18, 2012

Related U.S. Application Data

(63) Continuation of application No. 12/398,733, filed on Mar. 5, 2009, now Pat. No. 8,253,811.

(30) Foreign Application Priority Data

Mar. 5, 2008 (JP) ................................. 2008-055326

(51) Int. Cl.
*H04N 5/228* (2006.01)

(52) U.S. Cl.
USPC ........ 348/222.1; 348/373; 348/374; 348/375; 348/376

(58) Field of Classification Search
USPC ................. 348/208.1–208.8, 208.11–208.16, 348/373–376; 359/354–357
See application file for complete search history.

(56) References Cited

U.S. PATENT DOCUMENTS

| 5,266,988 | A | 11/1993 | Washisu |
| 5,842,053 | A | 11/1998 | Ueyama et al. |
| 2006/0013575 | A1 | 1/2006 | Senba et al. |

(Continued)

FOREIGN PATENT DOCUMENTS

| EP | 1 748 310 A2 | 1/2007 |
| EP | 1 795 945 A1 | 6/2007 |

(Continued)

OTHER PUBLICATIONS

Office Action issued May 8, 2009 in European Patent Application No. 09154400.7.

(Continued)

*Primary Examiner* — Yogesh Aggarwal
(74) *Attorney, Agent, or Firm* — Oblon, Spivak, McClelland, Maier & Neustadt, L.L.P.

(57) ABSTRACT

An image blur correcting unit allows the optical axis of a lens system to coincide with the center of an imager, thus correcting an image blur. The unit includes a stationary member and a holder member. The holder member holds either one of the elements of the lens system or the imager and moves relative to the stationary member in a first direction and a second direction, the first and second directions being orthogonal to each other in a plane orthogonal to the optical axis. The unit further includes a first guide section and a second guide section for guiding the holder member in the first and second directions during movement, and a driving section moving the holder member in the first and second directions. The one of the elements of the lens system or the imager is disposed outside an area surrounded by the first and second guide sections.

22 Claims, 14 Drawing Sheets

U.S. PATENT DOCUMENTS

| | | |
|---|---|---|
| 2006/0285840 A1 | 12/2006 | Takahashi |
| 2007/0031134 A1* | 2/2007 | Kuroda et al. ................... 396/55 |
| 2007/0133967 A1 | 6/2007 | Takahashi et al. |
| 2007/0242938 A1 | 10/2007 | Uno et al. |

FOREIGN PATENT DOCUMENTS

| | | |
|---|---|---|
| JP | 3-188430 | 8/1991 |
| JP | 2005-352125 | 12/2005 |
| JP | 2007-17957 | 1/2007 |
| JP | 2007-33879 | 2/2007 |
| JP | 2007-156351 | 6/2007 |
| JP | 2007-192847 | 8/2007 |
| JP | 2007-286318 | 11/2007 |
| JP | 2007-298915 | 11/2007 |
| JP | 2008-64844 | 3/2008 |

OTHER PUBLICATIONS

Office Action mailed Sep. 1, 2011 in U.S. Appl. No. 12/398,733.
Office Action issued Aug. 11, 2011 in Europe Application No. 09 154 400.7.

* cited by examiner

IMAGE BLUR CORRECTION UNIT, LENS BARREL DEVICE, AND CAMERA APPARATUS

CROSS REFERENCES TO RELATED APPLICATIONS

The present is a continuation application of and claims the benefit of priority under 35 U.S.C. §120 from U.S. application Ser. No. 12/398,733, filed Mar. 5, 2009, which claims of the benefit of priority under 35 U.S.C. §119 from Japanese Patent Application JP 2008-055326 filed in the Japanese Patent Office on Mar. 5, 2008, the entire contents of each of which is incorporated herein by reference.

BACKGROUND OF THE INVENTION

1. Field of the Invention

The present invention relates to an image blur correction unit, a lens barrel device, and a camera apparatus each correcting an image blur caused by a vibration upon shooting.

2. Description of the Related Art

Compact cameras are being requested to be further reduced in size and have higher power (magnification) and higher pixel resolution. Accordingly, this leads to an increased frequency of capturing an image blurred due to camera shake upon shooting a subject. As for a mechanism for shifting an optical element to compensate for camera shake, a retractable optical system and an optical-axis bending optical system each include a mechanism axially sliding in two directions. For example, in a related-art mechanism, the center of gravity of an optical element is disposed within an area surrounded by four guide shafts axially sliding in two directions.

For example, in an image blur correction unit disclosed in Japanese Unexamined Patent Application Publication No. 3-188430 (U.S. Pat. No. 5,266,988), a lens holding frame which holds a correction lens is held by a first holding frame having a pair of pitch shafts such that the lens holding frame is movable in the pitch direction. The first holding frame is supported by a second holding frame having a pair of yaw shafts such that the first holding frame is movable in the yaw direction. The correction lens held by the lens holding frame is located in an area surrounded by the pair of pitch shafts and the pair of yaw shafts. Actuators moving in the pitch direction and actuators moving in the yaw direction are each configured such that magnets and a yoke form a magnetic circuit and a coil is disposed in the magnetic circuit. Those actuators generate propulsive forces in the pitch direction and the yaw direction, respectively, using magnetic fields generated by currents flowing through the coils.

In the unit disclosed in Japanese Unexamined Patent Application Publication No. 3-188430, the actuators for driving the correction lens in the pitch direction and the other actuators for driving the correction lens in the yaw direction each have to include the magnets and the yoke. In addition, those actuators are arranged so as to surround the correction lens. Accordingly, the size of the image blur correction unit is increased in the direction orthogonal to the optical axis of the correction lens, thus upsizing a lens barrel and the whole of a camera and increasing the number of components. This leads to an increased cost.

In an optical-axis bending lens system in which the optical axis is bent at an angle of 90 degrees, if a correction lens is disposed in an area surrounded by four shafts in a manner similar to Japanese Unexamined Patent Application Publication No. 3-188430, it is difficult to reduce the thickness of a lens barrel, namely, further reduce the thickness thereof in the direction along the optical axis.

Assuming that the correction lens is disposed in the area surrounded by the four shafts, in order to reduce the size or thickness of a camera, an opening of a holding frame has to be sufficiently larger than the optical effective aperture. Upon reducing the size or thickness of the camera, however, it is difficult to ensure that the opening is sufficiently larger than the optical effective aperture. Disadvantageously, a stray light component may enter the optical path, thus causing a ghost image.

SUMMARY OF THE INVENTION

The present invention has been made in consideration of the above-described problems. It is desirable to provide an image blur correction unit, a lens barrel device, and a camera apparatus each including a miniaturized correction mechanism for image blur correction.

According to an embodiment of the present invention, there is provided an image blur correcting unit that allows the optical axis of a lens system to coincide with the center of an imager in order to correct an image blur. The unit includes a stationary member and a holder member holding either one of the elements of the lens system or the imager, the holder member moving relative to the stationary member in a first direction and a second direction, the first and second directions being orthogonal to each other in a plane orthogonal to the optical axis. The unit further includes first guide means for guiding the movement of the holder member in the first direction, second guide means for guiding the movement of the holder member in the second direction, and driving means for moving the holder member in the first and second directions. The one of the elements of the lens system or the imager is disposed outside an area surrounded by the first and second guide means when the first and second guide means are viewed from the optical axis.

According to another embodiment of the present invention, there is provided a lens barrel device including a stationary member, a holder member holding either one of the elements of a lens system or an imager and moving relative to the stationary member in a first direction and a second direction, the first and second directions being orthogonal to each other in a plane orthogonal to the optical axis, first guide means for guiding the movement of the holder member in the first direction, second guide means for guiding the movement of the holder member in the second direction, and driving means for moving the holder member in the first and second directions, wherein the one of the elements of the lens system or the imager is disposed outside an area surrounded by the first and second guide means when the first and second guide means are viewed from the optical axis.

According to another embodiment of the present invention, there is provided a camera apparatus that allows the optical axis of a lens system to coincide with the center of an imager in order to correct an image blur. The apparatus includes a stationary member and a holder member holding either one of the elements of the lens system or the imager, the holder member moving relative to the stationary member in a first direction and a second direction, the first and second directions being orthogonal to each other in a plane orthogonal to the optical axis. The apparatus further includes first guide means for guiding the movement of the holder member in the first direction, second guide means for guiding the movement of the holder member in the second direction, and driving means for moving the holder member in the first and second directions. The one of the elements of the lens system or the imager is disposed outside an area surrounded by the first and second guide means when the first and second guide means are viewed from the optical axis.

According to each of the embodiments of the present invention, since the one of the elements of the lens system or the imager is disposed outside the area surrounded by the first and second guide means when the first and second guide means are viewed from the optical axis, a lens barrel can be reduced in thickness and size.

DESCRIPTION OF THE PREFERRED EMBODIMENTS

A digital still camera 1 according to an embodiment of the present invention will be described with reference to the drawings. The digital still camera 1 will be simply referred to as "camera 1" below.

(1) Appearance Configuration of Digital Still Camera

Figure 1:
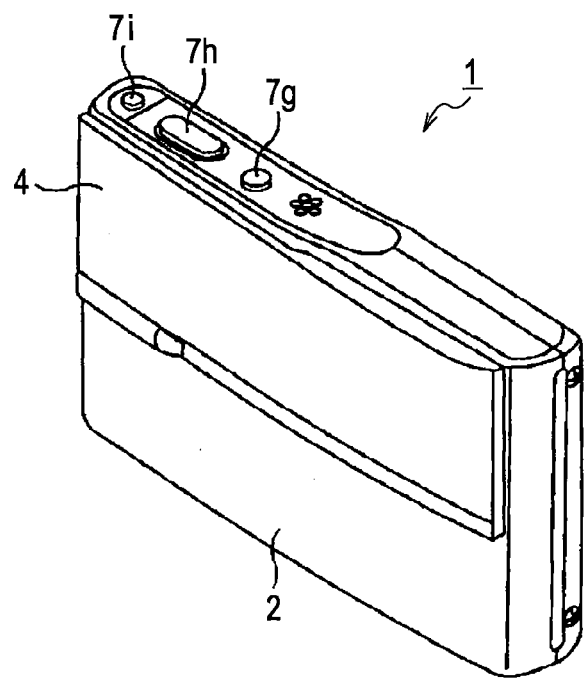
FIG. 1 is a front perspective view of a digital still camera according to an embodiment of the present invention, FIG. 1 illustrating a state in which a lens cover is closed.
Figure 2:
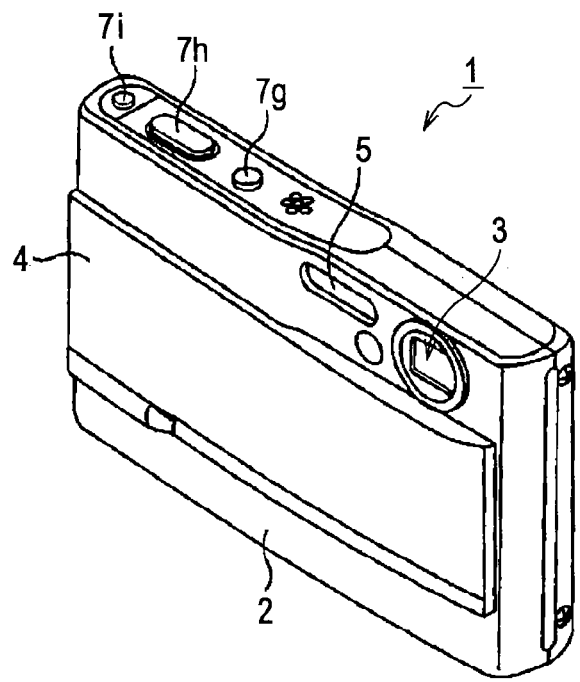
FIG. 2 is a front perspective view of the digital still camera according to the embodiment, FIG. 2 illustrating a state in which the lens cover is open.
Figure 3:
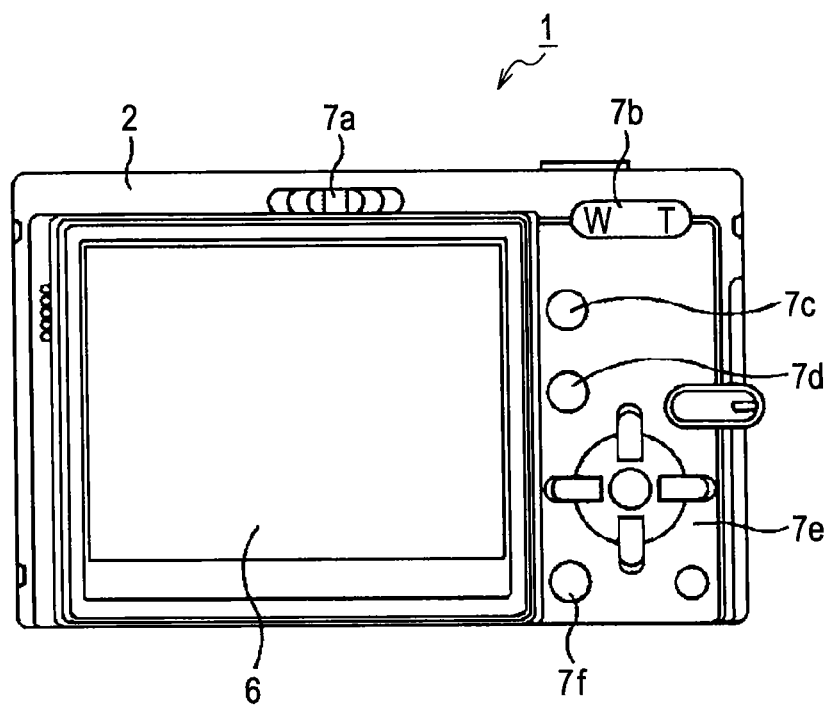
FIG. 3 is a rear view of the digital still camera according to the embodiment.

Referring to FIGS. 1 to 3, the camera 1 according to the present embodiment of the present invention uses a semiconductor recording medium as an information recording medium and converts an optical image, captured by shooting a subject, into an electrical signal through an imager (e.g., a charge-coupled device (CCD) imager or a complementary metal-oxide semiconductor (CMOS) imager) so that the optical image can be recorded in the semiconductor recording medium or be displayed on a display unit, such as a liquid crystal display.

The camera 1 has a laterally long and low-profile camera body 2. The camera body 2 has a lens 3 in the front thereof such that the lens 3 is disposed in one upper corner. The camera body 2 further has a vertically slidable lens cover 4 in the front thereof such that the lens cover 4 is slit downward upon shooting to expose the lens 3. A flash 5 is disposed in the vicinity of the lens 3 such that the flash 5 and the lens 3 are covered with the lens cover 4.

The camera body 2 has a display 6, such as an LCD or an electroluminescent (EL) display, in the rear thereof. The display 6 displays a subject that is to be captured by the imager or captured image data.

The camera body 2 further has various operation switches in the rear thereof. The operation switches include a mode selection switch 7a for selecting a functional mode (for still images, movies, or playback), a zoom button 7b for zoom in/out, a screen display switch button 7c for screen display, a menu button 7d for selection of various menu items, control keys 7e for moving a cursor for selecting a menu item, and a screen button 7f for changing a screen size or deleting an image.

The camera body 2 further has a power button 7g for power on/off, a recording button for recording, namely, starting or stopping shooting, and an anti-blur setting button 7i for activating an anti-blur function upon occurrence of camera shake to perform image blur correction.

The camera body 2 further includes therein various components, e.g., a lens barrel, a battery, a microphone, and a speaker.

(2) Configuration of Lens Barrel

Figure 4:
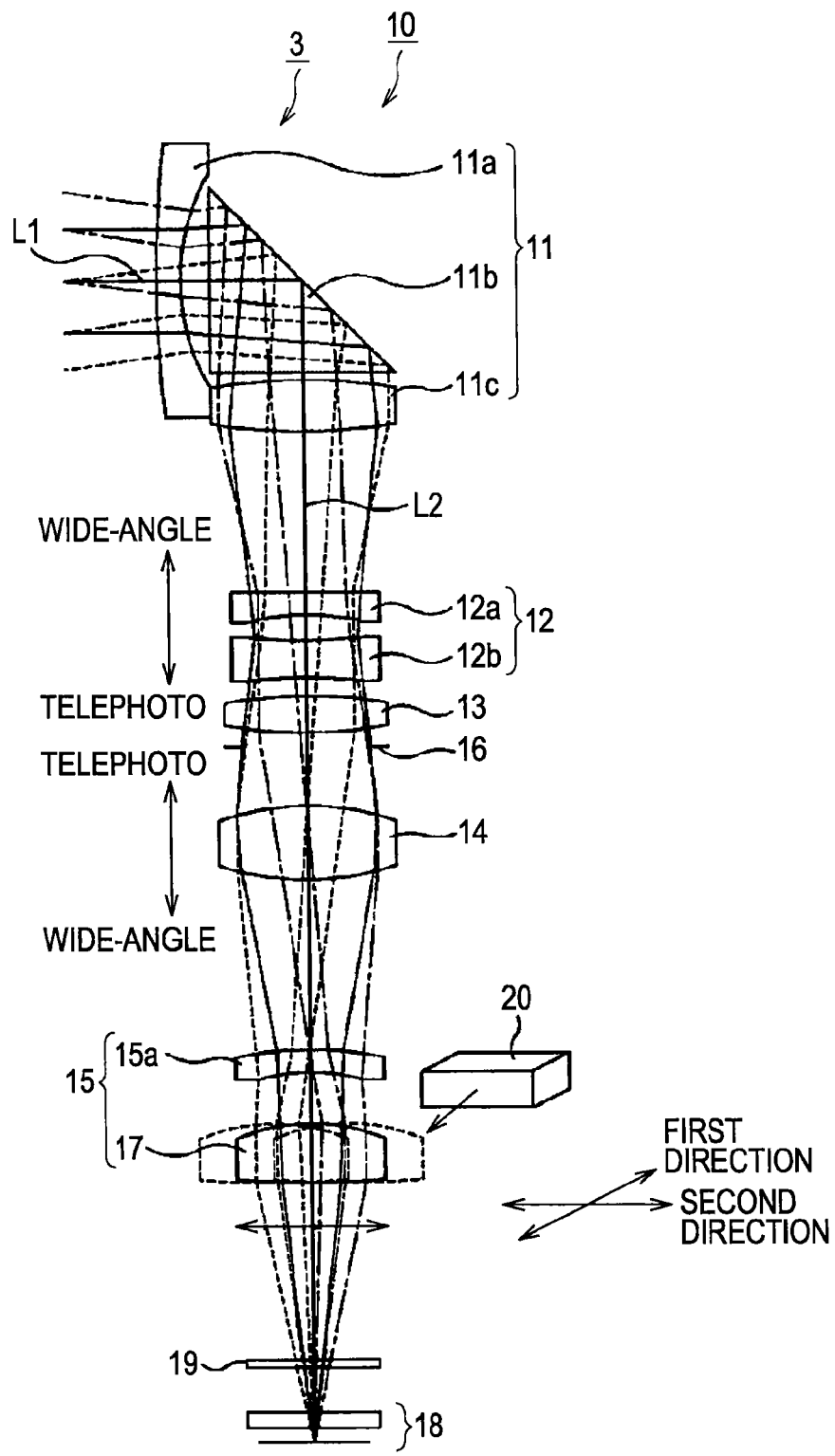
FIG. 4 is a side elevational view of a lens system arranged in a lens barrel.
Figure 5:
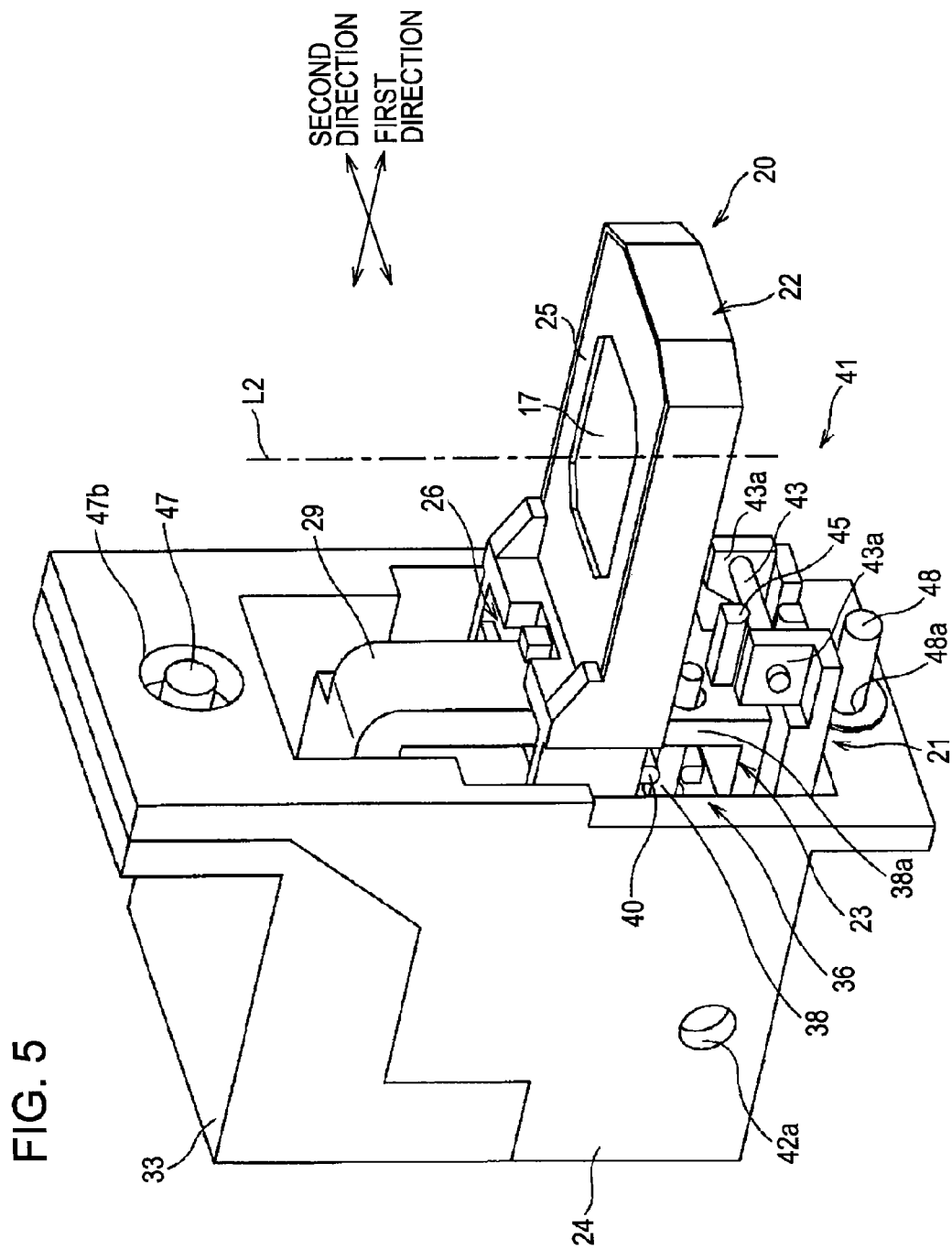
FIG. 5 is a perspective view of an image blur correction mechanism.

Referring to FIG. 4, a lens barrel 10 of the camera 1 holds a lens system including a plurality of lenses. The lens system held by the lens barrel 10 is of the optical-axis bending lens system and includes five lens units 11 to 15 arranged on the same optical axis L. As for the five lens units 11 to 15, the first lens unit 11 is disposed on the front side. The first lens unit 11 includes a first lens 11a, serving as an objective lens that faces a subject, a prism 11b disposed on the opposite side of the subject relative to the first lens 11a, and a second lens 11c opposed to the prism 11b. The prism 11b includes a triangular prism having a cross section shaped in an isosceles right triangle. One of the two faces, forming a right angle therebetween, of the prism 11b is opposed to the first lens 11a and the other face is opposed to the second lens 11c.

The prism 11b bends the optical axis L of the optical-axis bending lens system at an angle of substantially 90 degrees. Accordingly, a first optical axis segment L1 is set adjacent to the first lens 11a, serving as the objective lens, and a second optical axis segment L2 is set adjacent to an imager 18 disposed (on the image forming side) in the direction orthogonal to the first optical axis segment L1.

In the first lens unit 11, light passing through the first lens 11a, serving as the objective lens, enters the prism 11b. The light is reflected by the reflecting face, inclined relative to the first optical axis segment L1 at an angle of 45 degrees, of the prism 11b such that the travelling direction of the light is bent at an angle of 90 degrees. The light emerging from the prism 11b passes through the second lens 11c and then travels toward the second lens unit 12 along the second optical axis segment L2. The second lens unit 12 includes a combination of a third lens 12a and a fourth lens 12b. The second lens unit 12 is moved in the second optical axis segment L2 between a wide-angle position and a telephoto position. The light outgoing from the second lens unit 12 enters the third lens unit 13.

The third lens unit 13 includes a fifth lens fixed to the lens barrel 10. The fourth lens unit 14 including a sixth lens is disposed so as to follow the third lens unit 13. An aperture stop 16 capable of controlling the amount of light passing through the lens system is disposed between the third lens unit 13 and the fourth lens unit 14. The fourth lens unit 14 is movable along the second optical axis segment L2. The fifth lens unit 15 including a seventh lens 15a and a correction lens 17 is disposed so as to follow the fourth lens unit 14. The seventh lens 15a is fixed to the lens barrel and the correction lens 17 is movably disposed behind the seventh lens 15a. In addition, the imager 18 is disposed behind the correction lens 17.

The second lens unit 12 and the fourth lens unit 14 are independently moved along the second optical axis segment L2 such that each optical element is movable between the telephoto position and the wide-angle position. Specifically, the second lens unit 12 and the fourth lens unit 14 are moved in opposite directions for telephoto/wide-angle shooting. The second lens unit 12 and the fourth lens unit 14 are moved to the respective telephoto positions or the wide-angle positions to perform zooming control and focusing control. Specifically, upon zooming, the second lens unit 12 and the fourth lens unit 14 are moved from the respective wide-angle positions to the respective telephoto positions, thus performing zooming control. Upon focusing, the fourth lens unit 14 is moved from the wide-angle position to the telephoto position, thus performing focusing control.

The imager 18 is fixed to an imager adapter. The imager 18 is attached to the lens barrel through the imager adapter. An optical filter 19 is disposed in front of the imager 18. An image blur correction mechanism having the correction lens 17 is disposed between the optical filter 19 and the seventh lens 15a. The image blur correction mechanism, which will be described in detail below, corrects a captured image blurred by a vibration of the lens system. In a normal condition, the correction lens 17 is attached so that the optical axis of the lens 17 coincides with the second optical axis segment L2. When an image formed on the imaging surface of the imager 18 is blurred due to a vibration of the camera body 2, the image blur correction mechanism moves the correction lens 17 in two directions (i.e., a first direction X (yaw direction) and a second direction Y (pitch direction)) orthogonal to the second optical axis segment L2 to correct the image blur on the imaging surface. In the image blur correction mechanism, indicated at 20, the correction lens 17 alone is disposed on the optical axis and a guide mechanism and a driving mechanism for moving the correction lens 17 in the first and second directions are arranged outside, or around the correction lens 17.

(3) Configuration of Image Blur Correction Mechanism

Referring to FIGS. 5 to 8, the image blur correction mechanism 20 includes a stationary member 21, a lens holder member 22 holding the above-described correction lens 17, and a movable member 23. The lens holder member 22 is movable relative to the stationary member 21 in the first direction and the second direction which are orthogonal to each other in a plane orthogonal to the optical axis. The movable member 23 is disposed between the stationary member 21 and the lens holder member 22.

Figure 6:
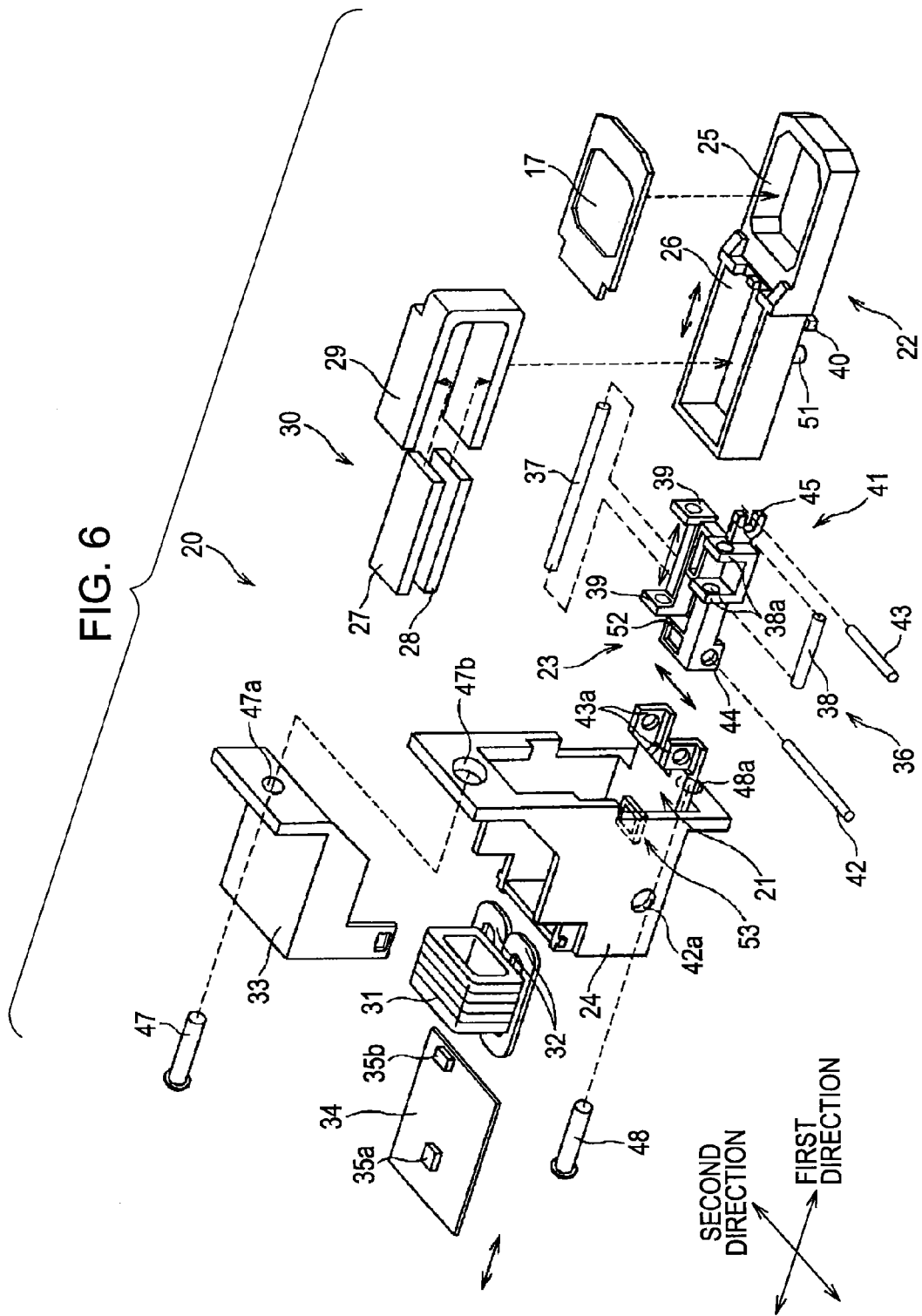
FIG. 6 is an exploded view of the image blur correction mechanism.
Figure 7:
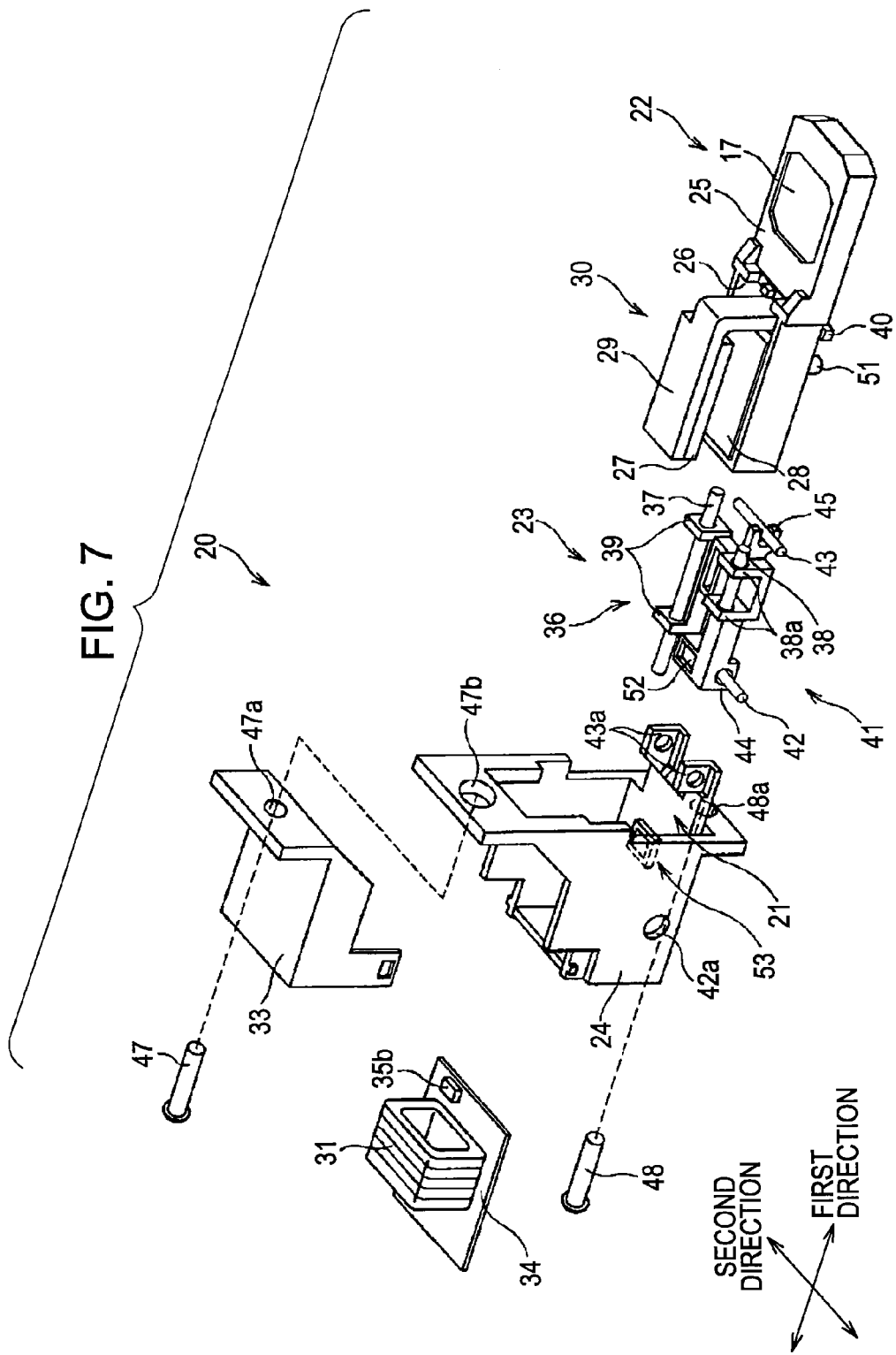
FIG. 7 is an exploded view of the image blur correction mechanism.

Referring to FIGS. 6 and 7, the stationary member 21 is attached to a frame 24. The frame 24 is formed by bending a metal plate so as to have a substantially rectangular cross section. The stationary member 21 is fixed to the bottom of the frame 24 by screws. The lens holder member 22 is movably disposed above the stationary member 21 and the movable member 23 is movably placed on the stationary member 21.

The lens holder member 22, disposed above the stationary member 21, has a lens holding portion 25 that holds the correction lens 17 in one end thereof. The lens holding portion 25 is formed as a through hole extending along the thickness of the lens holder member 22. The correction lens 17 is attached to the lens holding portion 25.

The lens holder member 22 has a component placement portion 26 in the other end thereof such that a magnetic circuit is disposed in the portion 26. The magnetic circuit constitutes the driving mechanism, indicated at 30, for moving the lens holder member 22 in the first and second directions which are orthogonal to each other.

The magnetic circuit, disposed in the component placement portion 26, has magnets 27 and 28 and a yoke 29 to which the magnets 27 and 28 are attached. The yoke 29 is formed in a substantially U-shape. The magnets 27 and 28 are attached to the inner surfaces of opposing parts of the yoke 29 such that the north pole and the south pole of one magnet are opposed to those of the other magnet, respectively. A first coil 31 for generating a propulsive force in the first direction and second coils 32 for generating a propulsive force in the second direction are arranged between the magnets 27 and 28 which are attached to the yoke 29 and are therefore spaced from each other.

The first coil 31 and the second coils 32 are disposed on a printed circuit board 34 attached to the frame 24. The first coil 31 acts with a magnetic force generated by the magnets 27 and 28 to produce the propulsive force in the first direction. The first coil 31, rolled in a cylinder, is fixed to one surface of the printed circuit board 34 using an adhesive. The second coils 32, 32 act with a magnetic force generated by the magnets 27 and 28 to produce the propulsive force in the second direction. The second coils 32, each including a flat coil, are fixed to the other surface of the printed circuit board 34 using an adhesive. The second coils 32 are arranged such that straight portions of the coils 32 are parallel to each other and driving currents flow through the adjacent straight portions in the same direction. The driving currents of the second coils 32 act with the magnetic force generated by the magnets 27 and 28 to produce the driving force in the second direction. The printed circuit board 34 having the first coil 31 and the second coils 32 thereon is incorporated in the frame 24 such that the printed circuit board 34 is disposed between the magnets 27 and 28. The second coils 32 may have the same size or different sizes.

The printed circuit board 34 has thereon a first Hall element 35a and a second Hall element 35b, serving as position sensors for detecting the amount of movement in the first direction and that in the second direction. The first and second Hall elements 35a and 35b are disposed so as to face the magnet 27. The first Hall element 35a detects the magnetic force of the magnet 27 and also detects the amount of movement of the lens holder member 22 in the first direction. The second Hall element 35b detects the magnetic force of the magnet 27 and also detects the amount of movement of the lens holder member 22 in the second direction.

As described above, the driving mechanism 30 includes the magnets 27 and 28, the yoke 29, the first coil 31, and the second coils 32. In the driving mechanism 30, the frame 24, in which the first coil 31 and the second coils 32 are arranged, serves as a stationary portion and the lens holder member 22, in which the magnets 27 and 28 and the yoke 29 are disposed, serves as a movable portion moving in the first and second directions. The driving mechanism 30 is enclosed by a cover 33 attached to the frame 24.

The configuration of the driving mechanism is not limited to the above-described one. For example, the magnets may be arranged on the frame 24 and the coils may be arranged on the lens holder member 22. In addition, the driving mechanism may include a stepping motor, a piezoelectric transducer (PZT), or a linear driving element as a driving source.

The movable member 23, disposed between the stationary member 21 and the lens holder member 22, has a first guide mechanism 36 and a second guide mechanism 41. The first guide mechanism 36 for guiding the lens holder member 22 during movement of the lens holder member 22 in the first direction is disposed between the movable member 23 and the lens holder member 22. The second guide mechanism 41 for guiding the lens holder member 22 during movement of the lens holder member 22 in the second direction is disposed between the movable member 23 and the stationary member 21.

The first guide mechanism 36 includes first guide shafts 37 and 38, first guide holes 39, and a first engagement member 40. The first guide shafts 37 and 38 are arranged in parallel to the first direction. The first guide holes 39 are arranged in the movable member 23 so as to receive the first guide shaft 37. The first engagement member 40 is arranged on the lens holder member 22 so as to be engaged with the other first guide shaft 38.

The first guide shaft 37 serves as a main shaft. Both ends of the shaft 37 are supported by support members 37a, 37a arranged on the lens holder member 22. As shown in FIGS. 6 to 9, the first guide shaft 37, serving as the main shaft, is disposed in the first guide holes 39 in the movable member 23. The other first guide shaft 38 serves as an auxiliary shaft relative to the first guide shaft 37, serving as the main shaft, and is shorter than the first guide shaft 37. Both ends of the first guide shaft 38 are supported by support members 38a, 38a arranged in the movable member 23. The first guide shaft 38 is engaged with the first engagement member 40 having a U-shaped form on the lens holder member 22.

The second guide mechanism 41 includes second guide shafts 42 and 43, second guide holes 44, and a second engagement member 45. The second guide shafts 42 and 43 are arranged in parallel to the second direction. The second guide holes 44 are arranged in the movable member 23 so as to receive the second guide shaft 42. The second engagement member 45 is disposed on the movable member 23 so as to be engaged with the other second guide shaft 43.

The second guide shaft 42 serves as a main shaft. Both ends of the shaft 42 are supported by support holes 42a, 42a which are arranged on both side surfaces of the frame 24, respectively. As shown in FIGS. 6 to 9, the second guide shaft 42 is arranged in the second guide holes 44 in the movable member 23. The other second guide shaft 43 serves as an auxiliary shaft relative to the second guide shaft 42, serving as the main shaft, and is shorter than the second guide shaft 42. Both ends of the second guide shaft 43 are supported by support members 43a, 43a arranged in the stationary member 21. The second guide shaft 43 is engaged with the second engagement member 45 having a U-shaped form on the movable member 23.

Referring to FIGS. 5 to 11, when the image blur correction mechanism 20 is incorporated into the lens barrel, only the correction lens 17 held by the lens holding portion 25 of the lens holder member 22 is disposed in the optical axis such that the correction lens 17 is located outside an area surrounded by the first guide mechanism 36 and the second guide mechanism 41. In other words, when the first guide mechanism 36 and the second guide mechanism 41 are viewed from the optical axis, the driving mechanism 30, the first guide mechanism 36, and the second guide mechanism 41 are located on the opposite side from the lens holding portion 25 in the longitudinal direction (the first direction). When the first guide mechanism 36 and the second guide mechanism 41 are viewed from the optical axis, the driving mechanism 30 is located within the area formed by the first guide mechanism 36 and the second guide mechanism 41. Accordingly, the image blur correction mechanism 20 can be reduced in thickness in the second optical axis segment L2 along which the plurality of lenses are arranged. In addition, the midpoint O between the first coil 31 and the two second coils 32 constituting the driving mechanism 30, i.e., the center of the driving mechanism for generating the propulsive forces in the first and second directions is located so as to substantially coincide with the center of the area surrounded by the first guide shafts 37 and 38 of the first guide mechanism 36 and the second guide shafts 42 and 43 of the second guide mechanism 41. Accordingly, in the image blur correction mechanism 20, a portion for generating the driving forces in the first and second directions is close to the positions of the first guide shafts 37 and 38 and the second guide shafts 42 and 43, thus reducing the propulsive forces (driving forces) used for movement in the first and second directions. Advantageously, power saving can be achieved.

The first guide mechanism 36 and the second guide mechanism 41 are mounted into the frame 24 incorporated with the stationary member 21, the lens holder member 22 in which the movable member 23 and the magnetic circuit are arranged in the component placement portion 26 is mounted into the frame 24, the driving mechanism 30 is covered with the cover 33, and after that, a screw 47 is inserted into an insertion hole 47a in the cover 33 and an insertion hole 47b in the frame 24, so that the image blur correction mechanism 20 is fastened to a frame of the lens barrel with this screw. A screw 48 is inserted into an insertion hole 48a in the frame 24, so that the frame 24 is fastened to the frame of the lens barrel with this screw.

Figure 8:
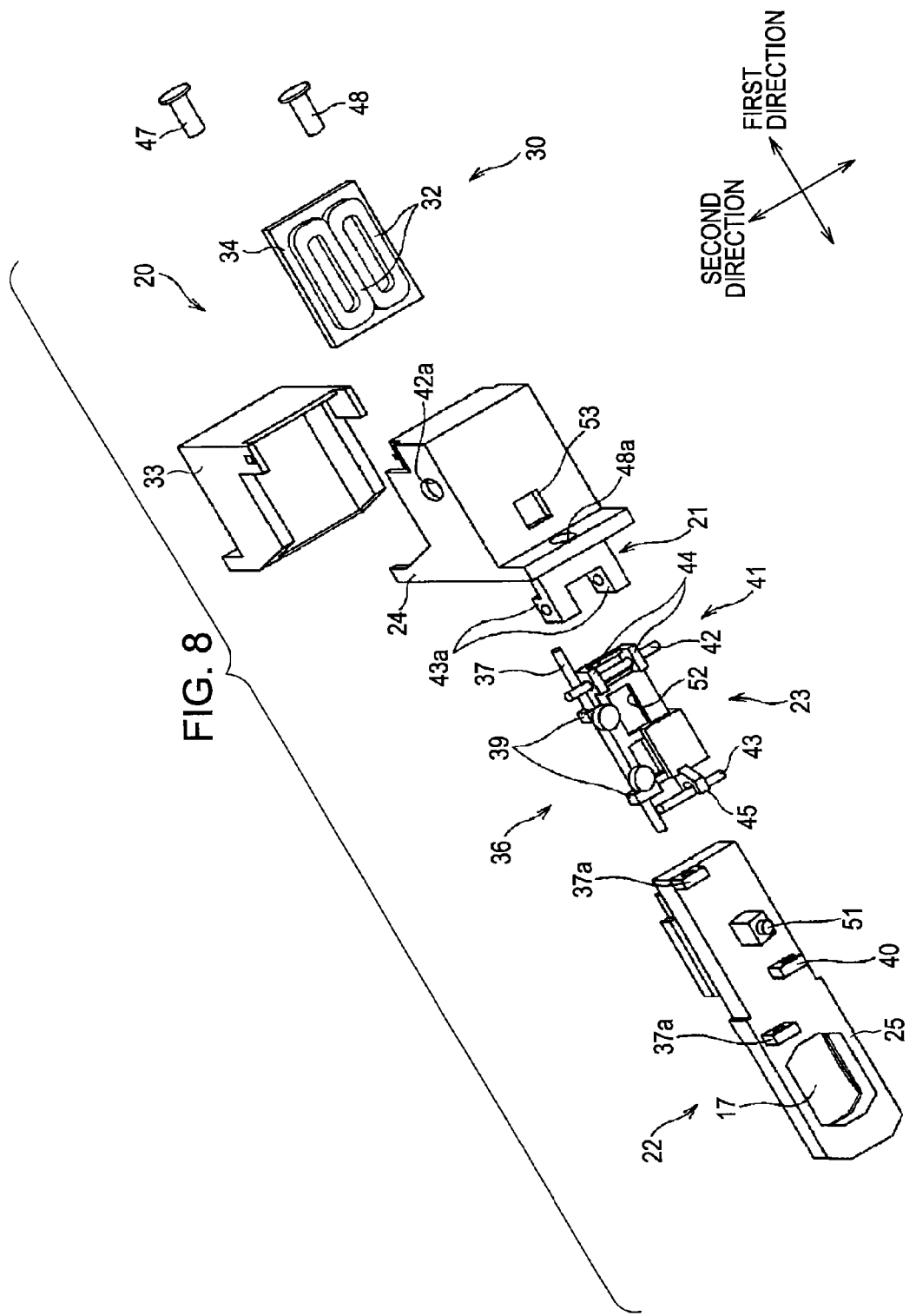
FIG. 8 is an exploded view of the image blur correction mechanism as viewed from the side opposite to the side in FIGS. 6 and 7.
Figure 9:
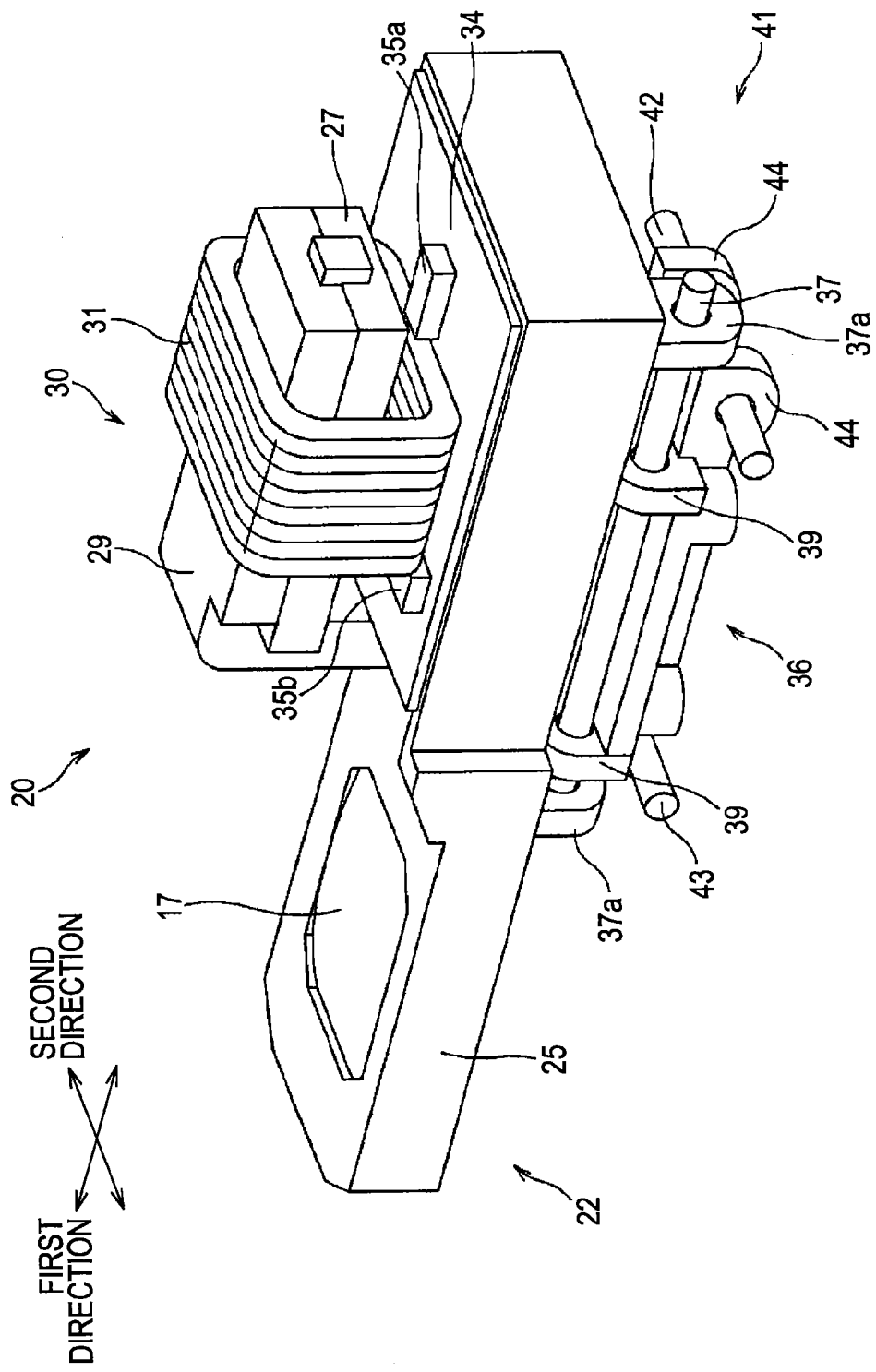
FIG. 9 is a perspective view of the image blur correction mechanism.
Figure 10:
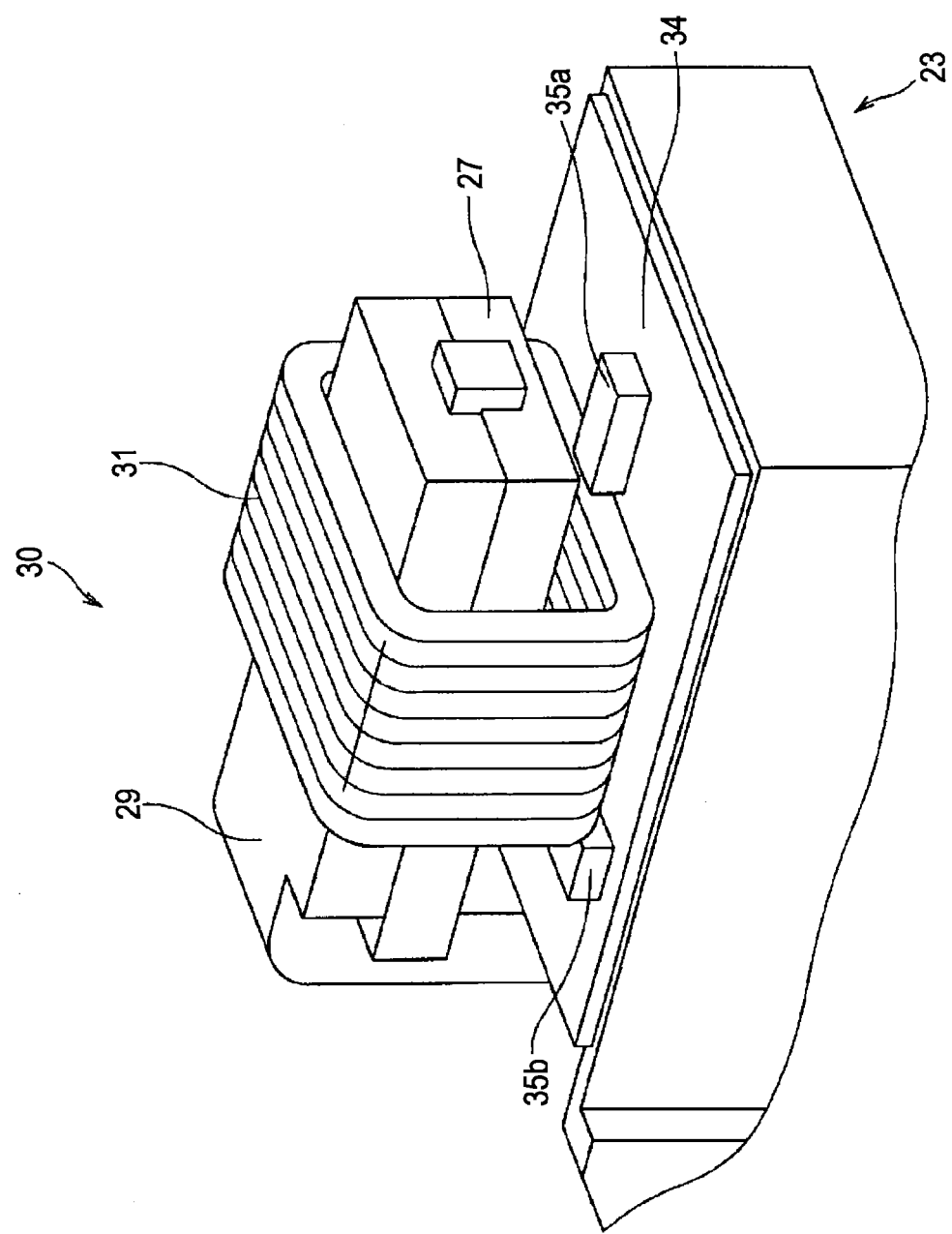
FIG. 10 is a perspective view of a driving mechanism.
Figure 11:
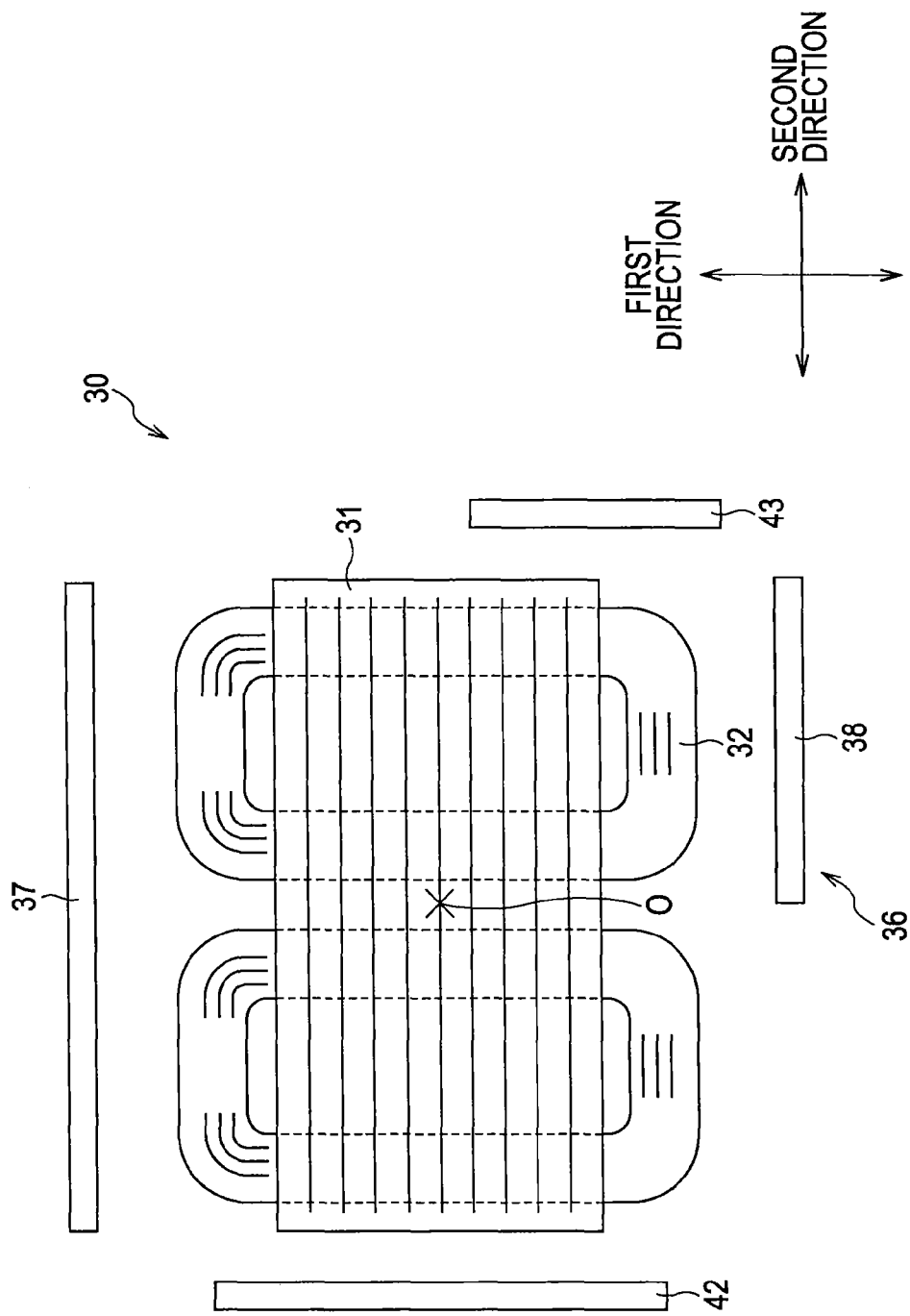
FIG. 11 is a plan view of the relative positional relationship among a first coil, second coils, a first guide mechanism, and a second guide mechanism.

Referring to FIG. 8, the lens holder member 22 has a restriction protrusion 51 on its surface that faces the stationary member 21 such that the restriction protrusion 51 is located in an area surrounded by the first guide mechanism 36 and the second guide mechanism 41. The restriction protrusion 51 restricts the amount of movement of the lens holder member 22 in the first and second directions. The restriction protrusion 51 is inserted into a through hole 52 in the movable member 23 and is then received in a restriction hole 53 in the stationary member 21. Although the lens holder member 22 is moved in the first and second directions by the driving mechanism 30, the restriction protrusion 51 on the lens holder member 22 is come into contact with the inner surface of the restriction hole 53 to restrict the movement in each direction. A method for restricting the amount of movement of the lens holder member 22 in the first and second directions is not limited to the above-described arrangement of the restriction protrusion 51 and the restriction hole 53.

An operation of the image blur correction mechanism 20 with the above-described configuration will be described below. When the driving mechanism 30 is not activated, the correction lens 17 in the lens holder member 22 is located in a midpoint position that coincides with the optical axis.

To move the lens holder member 22 from this midpoint position to one side in the first direction, a driving current flowing in one direction is supplied to the first coil 31 in the driving mechanism 30. Thus, the driving mechanism 30 generates a propulsive force allowing the lens holder member 22 to move toward the one side in the first direction by using the action of the driving current flowing in the one direction with a magnetic force generated through the magnets 27 and 28. In this instance, the movable member 23 is not moved relative to the stationary member 21 in the first direction by the second guide mechanism 41. Therefore, the lens holder member 22 is moved relative to the movable member 23 integrated with the stationary member 21 in the one direction while being guided by the first guide mechanism 36. To move the lens holder member 22 to the other side in the first direction, a driving current flowing in the opposite direction may be supplied to the first coil 31.

To move the lens holder member 22 from the midpoint position to one side in the second direction, a driving current flowing in one direction is supplied to each of the second coils 32 in the driving mechanism 30. Thus, the driving mechanism 30 generates a propulsive force allowing the lens holder member 22 to move to the one side in the second direction by using the action of the driving currents flowing in the one direction with a magnetic force generated through the magnets 27 and 28. In this instance, the lens holder member 22 is not moved relative to the movable member 23 in the second direction by the first guide mechanism 36. Consequently, the lens holder member 22 integrated with the movable member 23 is moved to the one side in the second direction while being guided by the second guide mechanism 41. To move the lens holder member 22 to the other side in the second direction, a driving current flowing in the opposite direction may be supplied to each of the second coils 32.

In the use of the image blur correction mechanism 20 with the above-described configuration, since the first guide mechanism 36 and the second guide mechanism 41 are not arranged around the lens holding portion 25, which holds the correction lens 17, of the lens holder member 22 and only the correction lens 17 is located in the optical path, the lens barrel can be reduced in thickness and size. In addition, since the low profile of the image blur correction mechanism 20 can be achieved reasonably in configuration, a stray light component can be prevented from entering the optical path to cause a ghost image.

(4) Circuit Configurations of Camera and Image Blur Correction Mechanism

Figure 12:
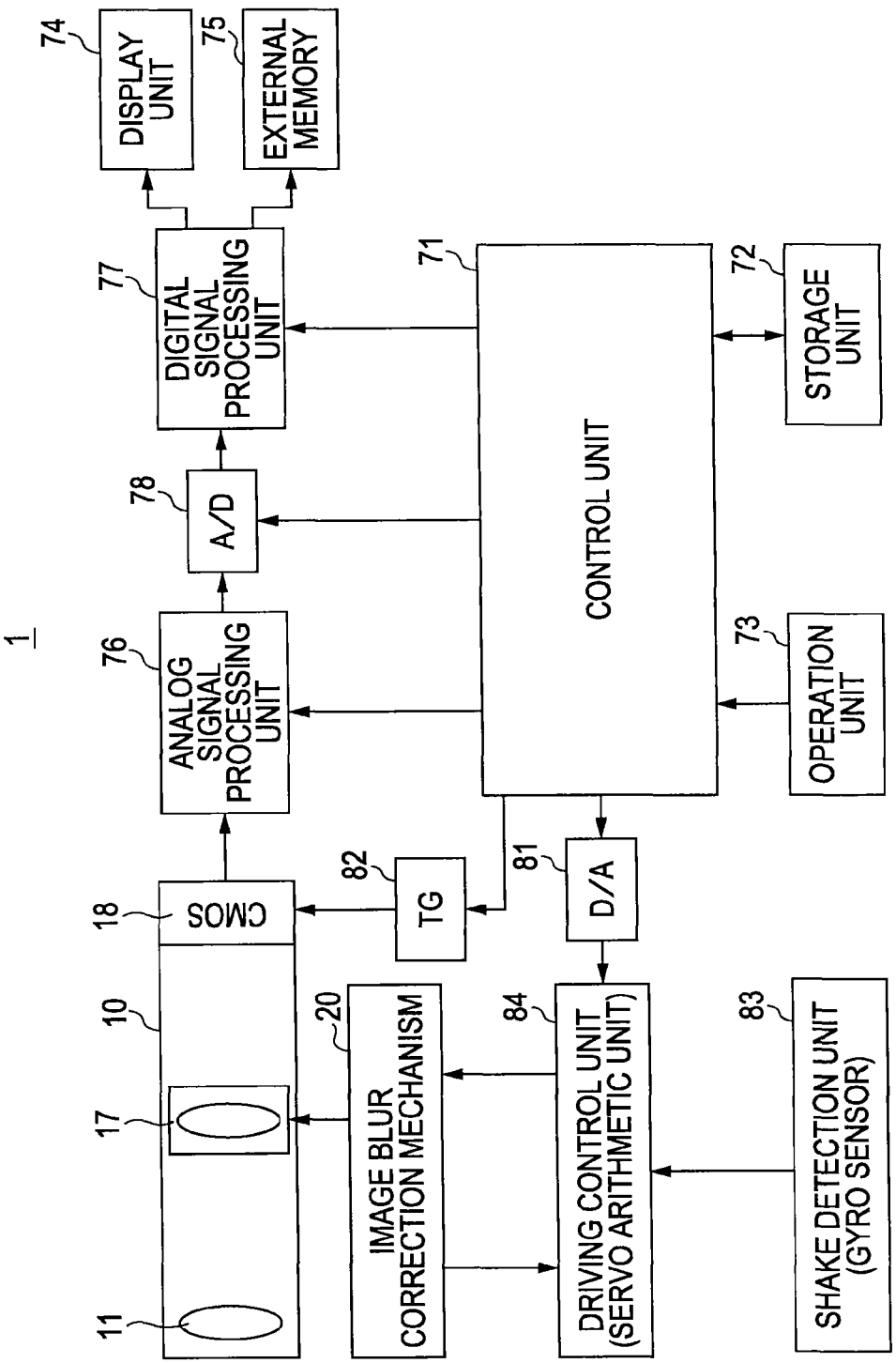
FIG. 12 is a block diagram of the circuit configuration of the camera.

FIG. 12 is a block diagram of the camera 1 including the above-described image blur correction mechanism 20. The camera 1 includes a control unit 71, a storage unit 72, an operation unit 73, a display unit 74, and an external memory 75. The control unit 71 controls an operation of the entire lens barrel having the image blur correction mechanism 20. The storage unit 72 includes a program memory and a data memory for driving the control unit 71, a RAM, and a ROM. The operation unit 73 receives various instruction signals for power on/off, shooting mode selection, and shooting. The display unit 74 displays a captured image. The external memory 75 increases the storage capacity.

The control unit 71 includes an arithmetic circuit including, for example, a microcomputer (CPU). The control unit 71 is connected to the storage unit 72, the operation unit 73, an analog signal processing unit 76, a digital signal processing unit 77, an analog-to-digital (A/D) converter 78, a digital-to-analog (D/A) converter 81, and a timing generator (TG) 82. The analog signal processing unit 76, which is connected to the imager 18, performs predetermined signal processing in accordance with an analog signal corresponding to a captured image output from the imager 18. The analog signal processing unit 76 is connected to the A/D converter 78, which converts a signal output of the analog signal processing unit 76 into digital form.

The D/A converter 81 is connected to a driving control unit 84 for performing servo arithmetic operation for image blur correction. The driving control unit 84 drives the image blur correction mechanism 20 in accordance with a position of the correction lens 17 to correct an image blur. The driving control unit 84 is connected to the first Hall element 35a and the second Hall element 35b, serving as the position sensors that detect the magnetic force of the magnets 27 and 28 attached to the lens holder member 22 of the driving mechanism 30 in the image blur correction mechanism 20 to detect the position of the lens holder member 22 in the first direction and that in the second direction. The TG 82 is connected to the imager 18.

When an image of a subject is formed on the imaging surface of the imager 18 through the lens system, the imager 18 outputs an image signal in analog form, the analog signal processing unit 76 performs predetermined processing on the analog signal, and after that, the A/D converter 78 converts the analog signal into a digital signal. The digital signal processing unit 77 performs predetermined processing on the digital signal output from the A/D converter 78. After that, the resultant signal is displayed as an image corresponding to the subject on the display unit 74. Alternatively, the signal is stored as information into the external memory 75.

In such a shooting mode, the image blur correction mechanism 20 is in an active state. When the camera body 2 is shaken or stirred, a gyro sensor 83 detects the shake or stir and outputs a detection signal to the driving control unit 84. The driving control unit 84 supplies predetermined driving signals as driving currents to the first coil 31 and the second coils 32 of the driving mechanism 30 in the image blur correction mechanism 20, thus moving the lens holder member 22 relative to the stationary member 21 in the first and second directions. Consequently, the correction lens 17 is moved to eliminate an image blur, so that a clear image can be obtained.

The circuit configuration of the driving control unit 84 for controlling the image blur correction mechanism 20 will be described below.

Figure 13:
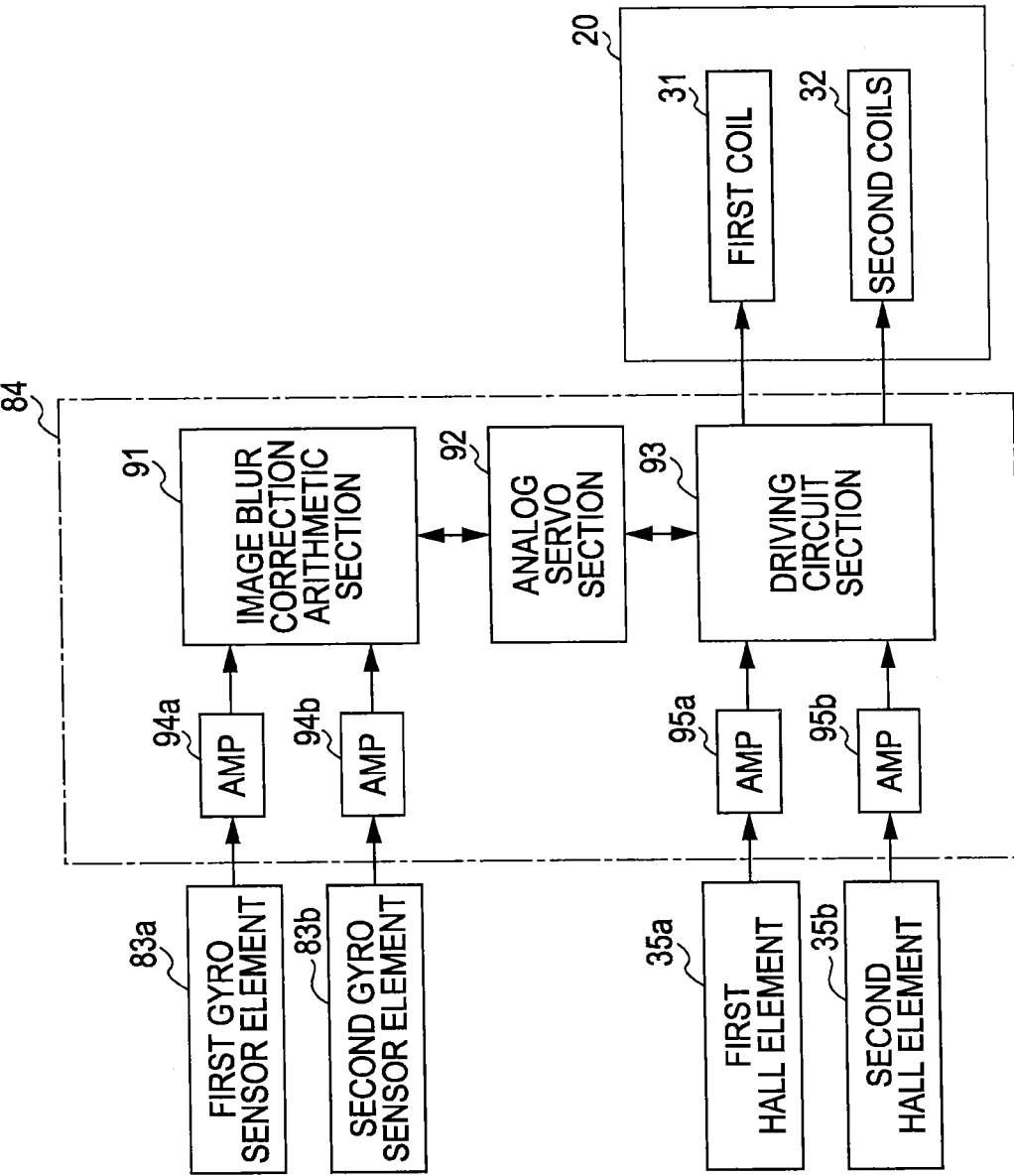
FIG. 13 is a block diagram of the circuit configuration of a driving control unit for controlling the image blur correction mechanism.

Referring to FIG. 13, the driving control unit 84 includes an image blur correction arithmetic section 91, an analog servo section 92, a driving circuit section 93, and four amplifiers 94a, 94b, 95a, and 95b. The image blur correction arithmetic section 91 is connected through the first amplifier (AMP) 94a to a first gyro sensor element 83a and is also connected through the second amplifier (AMP) 94b to a second gyro sensor element 83b.

The first gyro sensor element 83a detects an amount of shift of the camera body 2 in the first direction due to a hand shake applied to the camera body 2. This embodiment has been described with respect to the case where the two gyro sensor elements are arranged to individually detect amounts of shift in the first and second directions. One gyro sensor may detect amounts of shift in two directions, i.e., the first and second directions.

The image blur correction arithmetic section 91 is connected to the analog servo section 92. The analog servo section 92 converts a digital value calculated through the image blur correction arithmetic section 91 into analog form and outputs a control signal corresponding to the analog value. The analog servo section 92 is connected to the driving circuit section 93. The driving circuit section 93 is connected through the third amplifier (AMP) 95a to the first Hall element 35a serving as the first position sensor and is also connected through the fourth amplifier (AMP) 95b to the second Hall element 35b serving as the second position sensor. The driving circuit section 93 is further connected to the first coil 31 and the second coils 32 in the driving mechanism 30.

A signal indicating an amount of shift of the lens holder member 22 in the first direction detected through the first Hall element 35a is input to the driving circuit section 93 through the third amplifier 95a. A signal indicating an amount of shift of the lens holder member 22 in the second direction detected through the second Hall element 35b is input to the driving circuit section 93 through the fourth amplifier 95b. To move the correction lens 17 on the basis of those input signals and a control signal supplied from the analog servo section 92 so as to correct an image blur, the driving circuit section 93 supplies a predetermined driving current to either or each of the first coil 31 and the second coils 32.

(5) Modification

The above-described embodiment of the present invention has been described with respect to the case where the lens holder member 22 is moved relative to the stationary member 21 through the movable member 23 and the first and second guide mechanisms 36 and 41 including the shafts in the image blur correction mechanism 20. In the image blur correction mechanism 20, a ball may be disposed between the stationary member 21 and the lens holder member 22, so that the movable member 23 and the first and second guide mechanisms 36 and 41 may be omitted.

Figure 14:
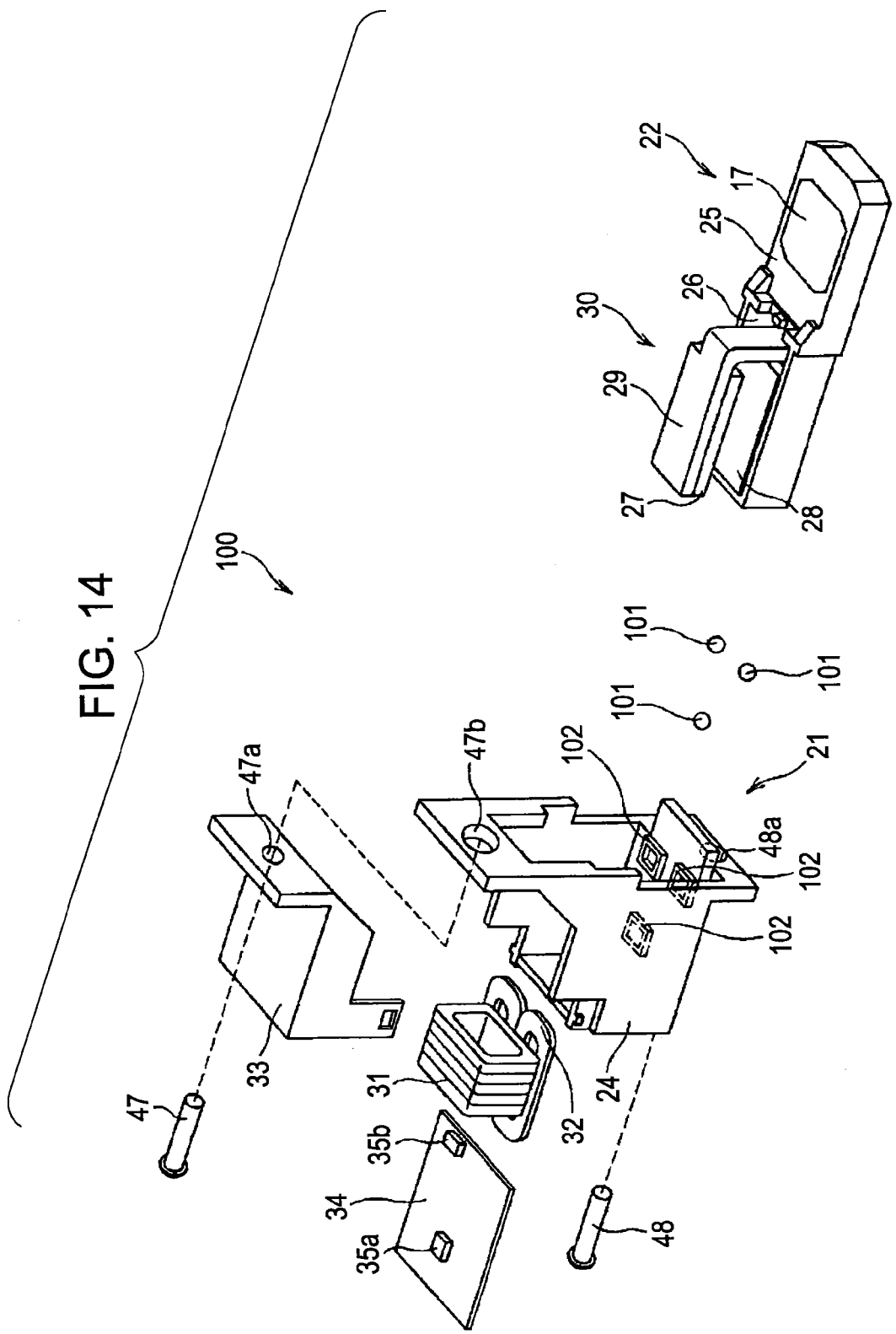
FIG. 14 is an exploded view of an image blur correction mechanism in accordance with a modification of the embodiment.

FIG. 14 illustrates an image blur correction mechanism 100 which includes the stationary member 21 and the lens holder member 22 and does not include the movable member 23. Furthermore, the image blur correction mechanism 100 does not include the first guide shafts 37 and 38 of the first guide mechanism 36, the first engagement member 40 on the lens holder member 22, the second guide shafts 42 and 43 of the second guide mechanism 41, and the second engagement member 45 on the movable member 23, the guide shafts 37, 38, 42, and 43 and the members 40 and 46 being arranged in the image blur correction mechanism 20. In other words, the configurations of the stationary member 21 and the lens holder member 22 can be simplified.

Figure 15:
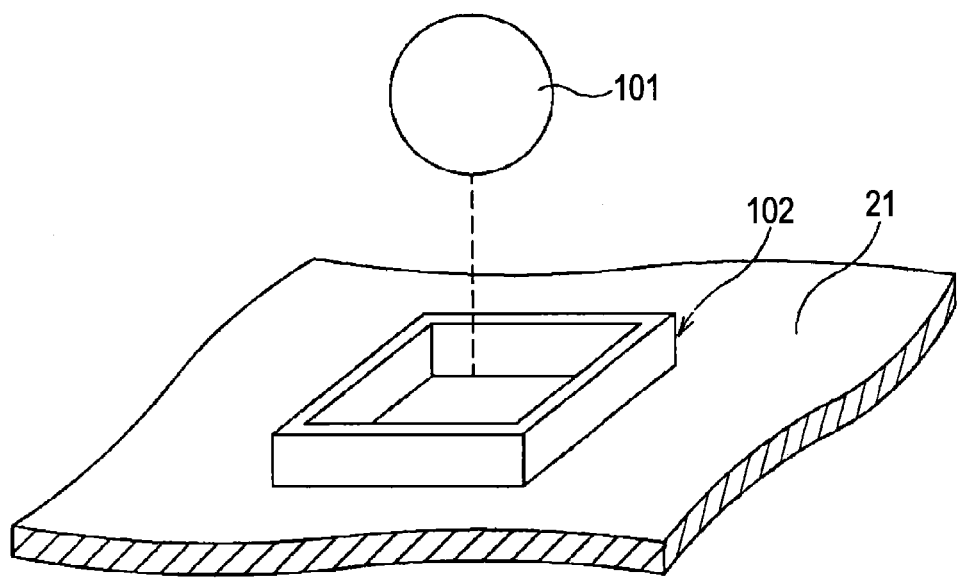
FIG. 15 is an exploded view of a ball and a ball holder constituting a support structure used in the mechanism in FIG. 14.
Figure 16:
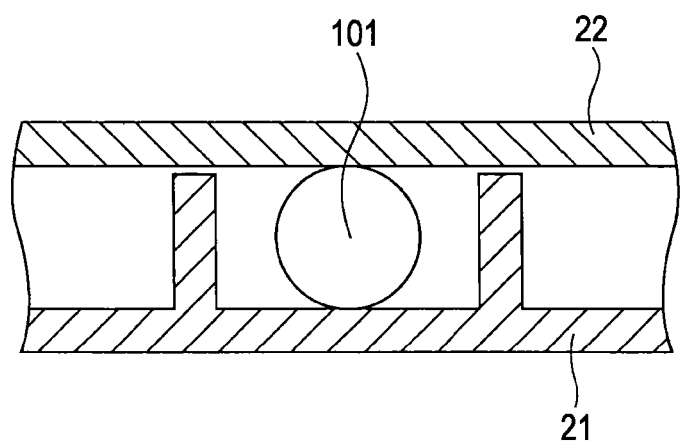
FIG. 16 is a cross-sectional view of the support structure.

In the image blur correction mechanism 100 with the above-described configuration, at least three balls 101 constituting a structure for supporting the lens holder member 22 are arranged between the stationary member 21 and the lens holder member 22. Referring to FIGS. 15 and 16, each ball 101 is received in a ball holder 102 disposed on one surface, which faces the lens holder member 22, of the stationary member 21. The corresponding surface, which faces the stationary member 21, of the lens holder member 22 is flat. Accordingly, when the driving mechanism 30 generates a propulsive force in the first direction and that in the second direction, each ball 101 is rotated in the corresponding ball holder 102 in response to the generated propulsive forces, so that the lens holder member 22 is moved in the first and second directions.

Although detailed description is omitted, the lens holder member 22 is not detached from the stationary member 21 by an anti-falling mechanism provided for the stationary member 21 or the frame 24 attached to the stationary member 21. For example, a first guide shaft and a second guide shaft like those in the first guide mechanism 36 and the second guide mechanism 41 may be provided for the stationary member 21 or the lens holder member 22 and those guide shafts may be engaged with respective engagement members, so that the lens holder member 22 can be configured so as not to be detached from the stationary member 21. In addition, such a mechanism can be made simpler than the first guide mechanism 36 and the second guide mechanism 41. To restrict an amount of movement of the lens holder member 22, the above-described restriction protrusion 51 and restriction hole 53 may be used.

(6) Other Modifications

In the above-described embodiment and modification, the image blur correction mechanism 20 or 100 for moving the correction lens 17 disposed above the imager 18 is provided to correct an image blur. According to another modification, the image blur correction mechanism 20 or 100 may be provided for the imager 18. In this case, the lens holder member 22 in the image blur correction mechanism 20 or 100 holds the imager 18 instead of the correction lens 17. The correction lens 17 is omitted in the lens barrel.

The digital still cameras according to the embodiment and modifications of the present invention have been described. The present invention may be applied to a digital video camera and may also be applied to a still camera using a silver halide film.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correcting unit that allows an optical axis of a lens system to coincide with a center of an imager in order to correct an image blur, the unit comprising:
   a stationary member;
   a holder member holding either one of elements of the lens system or the imager, the holder member moving relative to the stationary member in a first direction and a second direction, and the first and second directions being orthogonal to each other in a plane orthogonal to the optical axis;
   first guide means for guiding the movement of the holder member in the first direction;
   second guide means for guiding the movement of the holder member in the second direction;
   driving means for moving the holder member in the first and second directions, wherein
   the one of the elements of the lens system or the imager is disposed outside an area surrounded by the first and second guide means when the first and second guide means are viewed from the optical axis; and
   a restricting member restricting the movement of the holder member in the first and second directions, the restricting member being disposed in the area surrounded by the first and second guide means when the first and second guide means are viewed from the optical axis, wherein
   the restricting member includes a protrusion inserted into a guide hole that restricts the movement of the holder member in the first and second directions by contact between the protrusion and the guide hole in the first and second directions.

2. The unit according to claim 1, wherein a driving-force generating portion of the driving means is located in the area surrounded by the first and second guide means when the first and second guide means are viewed from the optical axis.

3. The unit according to claim 1, wherein the area surrounded by the first and second guide means is laterally displaced, with respect to the optical axis, relative to another area surrounded by the one of the elements of the lens system or the imager.

4. The unit according to claim 1, wherein
   the lens system is of an optical-axis bending type in which the optical axis is bent at an angle of 90 degrees, and the driving means is located such that the driving means is offset from an optical axis segment adjacent to the imager.

5. A lens barrel device comprising:
a stationary member;
a holder member holding either one of the elements of a lens system or an imager and moving relative to the stationary member in a first direction and a second direction, the first and second directions being orthogonal to each other in a plane orthogonal to an optical axis;
first guide means for guiding the movement of the holder member in the first direction;
second guide means for guiding the movement of the holder member in the second direction;
driving means for moving the holder member in the first and second directions, wherein
the one of the elements of the lens system or the imager is disposed outside an area surrounded by the first and second guide means when the first and second guide means are viewed from the optical axis; and
a restricting member restricting the movement of the holder member in the first and second directions, the restricting member being disposed in the area surrounded by the first and second guide means when the first and second guide means are viewed from the optical axis, wherein
the restricting member includes a protrusion inserted into a guide hole that restricts the movement of the holder member in the first and second directions by contact between the protrusion and the guide hole in the first and second directions.

6. The device according to claim 5, wherein a driving-force generating portion of the driving means is located in the area surrounded by the first and second guide means when the first and second guide means are viewed from the optical axis.

7. The device according to claim 5, wherein the area surrounded by the first and second guide means is laterally displaced, with respect to the optical axis, relative to another area surrounded by the one of the elements of the lens system or the imager.

8. The device according to claim 5, wherein
the lens system is of an optical-axis bending type in which the optical axis is bent at an angle of 90 degrees, and
the driving means is located such that the driving means is offset from an optical axis segment adjacent to the imager.

9. A camera apparatus that allows an optical axis of a lens system to coincide with a center of an imager in order to correct an image blur, the apparatus comprising:
a stationary member;
a holder member holding either one of elements of the lens system or the imager, the holder member moving relative to the stationary member in a first direction and a second direction, and the first and second directions being orthogonal to each other in a plane orthogonal to the optical axis;
first guide means for guiding the movement of the holder member in the first direction;
second guide means for guiding the movement of the holder member in the second direction;
driving means for moving the holder member in the first and second directions, wherein
the one of the elements of the lens system or the imager is disposed outside an area surrounded by the first and second guide means when the first and second guide means are viewed from the optical axis; and
a restricting member restricting the movement of the holder member in the first and second directions, the restricting member being disposed in the area surrounded by the first and second guide means when the first and second guide means are viewed from the optical axis, wherein
the restricting member includes a protrusion inserted into a guide hole that restricts the movement of the holder member in the first and second directions by contact between the protrusion and the guide hole in the first and second directions.

10. The apparatus according to claim 9, wherein a driving-force generating portion of the driving means is located in the area surrounded by the first and second guide means when the first and second guide means are viewed from the optical axis.

11. The apparatus according to claim 9, wherein the area surrounded by the first and second guide means is laterally displaced, with respect to the optical axis, relative to another area surrounded by the one of the elements of the lens system or the imager.

12. The apparatus according to claim 9, wherein
the lens system is of an optical-axis bending type in which the optical axis is bent at an angle of 90 degrees, and
the driving means is located such that the driving means is offset from an optical axis segment adjacent to the imager.

13. An image blur correcting unit that allows an optical axis of a lens system to coincide with a center of an imager in order to correct an image blur, the unit comprising:
a stationary member;
a holder member holding either one of elements of the lens system or the imager, the holder member moving relative to the stationary member in a first direction and a second direction, and the first and second directions being orthogonal to each other in a plane orthogonal to the optical axis;
a first guide section guiding the movement of the holder member in the first direction;
a second guide section guiding the movement of the holder member in the second direction;
a driving section moving the holder member in the first and second directions, wherein
the one of the elements of the lens system or the imager is disposed outside an area surrounded by the first and second guide sections when the first and second guide sections are viewed from the optical axis; and
a restricting member restricting the movement of the holder member in the first and second directions, the restricting member being disposed in the area surrounded by the first and second guide means when the first and second guide means are viewed from the optical axis, wherein
the restricting member includes a protrusion inserted into a guide hole that restricts the movement of the holder member in the first and second directions by contact between the protrusion and the guide hole in the first and second directions.

14. A lens barrel device comprising:
a stationary member;
a holder member holding either one of elements of a lens system or an imager and moving relative to the stationary member in a first direction and a second direction, the first and second directions being orthogonal to each other in a plane orthogonal to an optical axis;
a first guide section guiding the movement of the holder member in the first direction;

a second guide section guiding the movement of the holder member in the second direction;

a driving section moving the holder member in the first and second directions, wherein the one of the elements of the lens system or the imager is disposed outside an area surrounded by the first and second guide sections when the first and second guide sections are viewed from the optical axis; and a restricting member restricting the movement of the holder member in the first and second directions, the restricting member being disposed in the area surrounded by the first and second guide means when the first and second guide means are viewed from the optical axis, wherein the restricting member includes a protrusion inserted into a guide hole that restricts the movement of the holder member in the first and second directions by contact between the protrusion and the guide hole in the first and second directions.

15. A camera apparatus that allows an optical axis of a lens system to coincide with a center of an imager in order to correct an image blur, the apparatus comprising:

a stationary member;

a holder member holding either one of elements of the lens system or the imager, the holder member moving relative to the stationary member in a first direction and a second direction, and the first and second directions being orthogonal to each other in a plane orthogonal to the optical axis;

a first guide section guiding the movement of the holder member in the first direction;

a second guide section guiding the movement of the holder member in the second direction;

a driving section moving the holder member in the first and second directions, wherein the one of the elements of the lens system or the imager is disposed outside an area surrounded by the first and second guide sections when the first and second guide sections are viewed from the optical axis; and a restricting member restricting the movement of the holder member in the first and second directions, the restricting member being disposed in the area surrounded by the first and second guide means when the first and second guide means are viewed from the optical axis, wherein the restricting member includes a protrusion inserted into a guide hole that restricts the movement of the holder member in the first and second directions by contact between the protrusion and the guide hole in the first and second directions.

16. The unit according to claim 3, wherein the area surrounded by the first and second guide means and the another area surrounded by the one of the elements of the lens system or the imager are in a same plane extending in the first and second directions and do not overlap.

17. The device according to claim 7, wherein the area surrounded by the first and second guide means and the another area surrounded by the one of the elements of the lens system or the imager are in a same plane extending in the first and second directions and do not overlap.

18. The apparatus according to claim 11, wherein the area surrounded by the first and second guide means and the another area surrounded by the one of the elements of the lens system or the imager are in a same plane extending in the first and second directions and do not overlap.

19. The unit according to claim 13, wherein:

the area surrounded by the first and second guide means is laterally displaced, with respect to the optical axis, relative to another area surrounded by the one of the elements of the lens system or the imager, and the area surrounded by the first and second guide means and the another area surrounded by the one of the elements of the lens system or the imager are in a same plane extending in the first and second directions and do not overlap.

20. The device according to claim 14, wherein:

the area surrounded by the first and second guide means is laterally displaced, with respect to the optical axis, relative to another area surrounded by the one of the elements of the lens system or the imager, and the area surrounded by the first and second guide means and the another area surrounded by the one of the elements of the lens system or the imager are in a same plane extending in the first and second directions and do not overlap.

21. The apparatus according to claim 15, wherein:

the area surrounded by the first and second guide means is laterally displaced, with respect to the optical axis, relative to another area surrounded by the one of the elements of the lens system or the imager, and the area surrounded by the first and second guide means and the another area surrounded by the one of the elements of the lens system or the imager are in a same plane extending in the first and second directions and do not overlap.

22. The unit according to claim 1, further comprising:

a movable member disposed between the stationary member and the holder member, wherein the first and second guide means are provided on the movable member, the restricting member and the protrusion are provided on the holding member, and the guide hole is provided in the movable member.

* * * * *